(12) United States Patent
Kuster et al.

(10) Patent No.: US 7,106,722 B1
(45) Date of Patent: Sep. 12, 2006

(54) SYSTEM FOR MEDIA GATEWAY TO MEDIA GATEWAY ADDRESS INFORMATION EXCHANGE

(75) Inventors: Josephus Kuster, Plano, TX (US); Eric Valentine, Plano, TX (US)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 735 days.

(21) Appl. No.: 09/643,224

(22) Filed: Aug. 20, 2000

(51) Int. Cl.
*H04L 12/66* (2006.01)
*H04L 12/56* (2006.01)
*H04J 3/12* (2006.01)

(52) U.S. Cl. .................. 370/352; 370/401; 370/466

(58) Field of Classification Search ............... 370/351, 370/389, 400, 401, 352, 354, 355
See application file for complete search history.

(56) References Cited

U.S. PATENT DOCUMENTS

| | | | |
|---|---|---|---|
| 5,650,993 A * | 7/1997 | Lakshman et al. | 370/236 |
| 5,659,596 A * | 8/1997 | Dunn | 455/456.1 |
| 5,802,465 A * | 9/1998 | Hamalainen et al. | 455/403 |
| 6,052,730 A * | 4/2000 | Felciano et al. | 709/225 |
| 6,252,952 B1 * | 6/2001 | Kung et al. | 379/114.1 |
| 6,445,696 B1 * | 9/2002 | Foodeei et al. | 370/356 |
| 6,614,781 B1 * | 9/2003 | Elliott et al. | 370/352 |
| 6,717,939 B1 * | 4/2004 | McGrew | 370/352 |
| 6,721,565 B1 * | 4/2004 | Ejzak et al. | 455/436 |
| 6,754,180 B1 * | 6/2004 | Christie | 370/236 |
| 6,765,912 B1 * | 7/2004 | Vuong | 370/395.2 |

FOREIGN PATENT DOCUMENTS

| | | |
|---|---|---|
| WO | WO 00 31951 A | 6/2000 |
| WO | WO 00 33523 A | 6/2000 |

OTHER PUBLICATIONS

Rao H C H et al: "IGSM: VOLP Service for Mobile Networks" IEEE Communications Magazine, IEEE Service Center, Piscataway, N.J., US, vol. 38, No. 4, Apr. 2000, pp. 62-69, XP000949643 ISSN: 0163-6804 abstract; figure 1 p. 63, column 1, line 8-p. 64, column 2, line 10 p. 65, column 1, line 6-p. 66, column 1, line 4.

* cited by examiner

*Primary Examiner*—Doris H. To
*Assistant Examiner*—Soon D. Hyun

(57) ABSTRACT

A method and protocol for providing direct, per-call address information exchange (216, 218) between two distinct IP media gateways, including establishment of a first termination point (128) in an originating media gateway (120), transferring address information for the first termination point (204, 206, 214) to a receiving media gateway (124), establishing (220) of a second termination point (130) in the receiving media gateway, and using the address information to establish direct communication between the first and second termination points.

20 Claims, 2 Drawing Sheets

SYSTEM FOR MEDIA GATEWAY TO MEDIA GATEWAY ADDRESS INFORMATION EXCHANGE

FIELD OF THE INVENTION

The present invention relates generally to packet switched communications networks and, in particular, to a system for exchanging address information between media gateways in a packet switched network.

BACKGROUND OF THE INVENTION

The usage of, and demand for, mobile telecommunications continue to increase at a staggering rate. Wireless telecommunications service providers are constantly seeking new ways to improve and expand the services they provide while lowering their investment and operational costs. This ever-increasing demand has driven the development of new and improved topologies and protocols for wireless communications systems. It is now possible to route voice communications, in packetized form, over Internet Protocol (IP) systems conventionally associated with computer data communications. Such capabilities hold the promise increasing efficiency and decreasing costs associated with wireless communications.

Interest grows in IP-based communications as an alternative to conventional circuit switched systems. Circuit switched systems require dedicated channels, reserving an ISUP (ISDN user part) link for any given communication. Therefore, any given call effectively monopolizes a line (e.g. trunk or E1/T1 line) between call origin and destination; requiring a separate line for each call processed. Even in conventional "wireless" communications systems, a call is generally only wireless between the mobile unit and its closest base station, which thereafter typically routes the call on circuit switched infrastructure. For example, in a typical GSM (Global System for Mobile communications) network, once a signal is received at the base station, it is thereafter routed via circuit switched infrastructure to the mobile switching center (MSC) and the rest of the GSM system.

It should thus easily be appreciated that as demand continues to increase, infrastructure associated with circuit switched systems must increase correspondingly. This results in increased system overhead, reduced call volume bandwidth, and increased user costs to cover the additional overhead.

In comparison, IP communications packetize voice data for transmission over existing IP networks; enabling users to communicate (e.g. via phone calls or computer-based conferencing applications) as long as they want for only the cost of the access to the IP network. IP infrastructure is ubiquitous; and use of IP infrastructure is not dedicated (i.e. multiple users utilize, one packet at a time, the same resources), lowering system overhead and use costs.

Although IP network communication is, in some respects, advantageous over circuit switched communication, other considerations limit the commercial usefulness of conventional IP network implementations. Consider, for example, a wireless communications system where communications between two disparate radio access networks are transferred across and IP based network.

Usually, each radio access network will interact with a media gateway in the IP network that serves as an interface to the IP network. Conventionally in such topologies there is no protocol or capability for direct address information exchange between the media gateways on a per-call basis. This usually results in superfluous exchanges between other wireless infrastructure (e.g., ATM based transfers between MSCs) that degrade the efficiency and quality of communication.

SUMMARY OF THE INVENTION

From the foregoing, it can be appreciated that a need exists for a providing efficient and cost-effective IP network communication in wireless telecommunication applications. It is desirable that such a system provide structure and methods by which one media gateway can directly exchange address information with another media gateway on a per-call basis; overcoming the limitations of conventional systems.

The present invention provides a system for direct, IP-based connection and communication exchange between two separate media gateways, without relying on intervention or relay by other infrastructure elements. The present invention provides a process by which two media gateways may be configured for direct address exchange. The present invention further provides a novel, IP-based protocol for media gateway to media gateway address exchange.

More specifically, the present invention provides a method and a protocol for providing direct, per-call information exchange between two distinct IP media gateways; including establishment of a first termination point in the originating media gateway, transfer of address information for the first termination point to a receiving media gateway, establishment of a second termination point in the receiving media gateway, and using the address information to establish direct communication between the first and second termination points.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and the use of the present invention is discussed in detail below, it should be appreciated that the present invention provides many applicable inventive concepts which can be embodied in a wide variety of specific contexts. The specific embodiments discussed herein are merely illustrative of specific ways to make and use the invention, do not delimit the scope of the invention.

The present invention defines a system providing direct, IP-based connection and communication exchange between two separate media gateways without relying on intervention or relay by other communications structures. The present invention provides efficient and cost effective Internet Protocol (IP) network-based communication.

It should be understood that the principles and applications disclosed herein can be applied to a wide range of wireless telecommunications systems where direct communication across an IP network between two or more media gateways is desired. The teachings of this disclosure may be applied in adapting a variety of system topologies and protocols.

As previously described, IP networks may present wireless telecommunications providers and users with a number of advantages over conventional circuit switched networks. Circuit switched systems require dedicated channels (e.g., trunks); resulting in greater system overhead, reduced volume bandwidth, and increased user costs (to cover the additional overhead). Circuit switched networks requires enormous investment in infrastructure to provide ability to secure dedicated lines for every call. By way of comparison, IP network systems packetize voice data over existing IP networks, enabling users to call or video-conference as long as they want for only the cost of the access to the IP network. IP infrastructure is ubiquitous, and use of IP infrastructure is not dedicated; lowering the associated overhead and use costs (i.e. multiple users are utilizing, one packet at a time, the same resources). Although it holds the potential for much greater efficiency, IP network communication service has not proven to be as reliable as circuit switched communication, and therefore is still not widely utilized.

The present invention provides a new protocol between media gateways (MGWs) for direct exchange of address information on a per call basis. In each MGW, a termination point (TP) will be reserved on the IP network side. For transmission of speech information over the IP link, all MGWs will comprehend the others' IP addresses and, to distinguish between different calls, also the UDP port number used on each side for a specific call.

Figure 1:
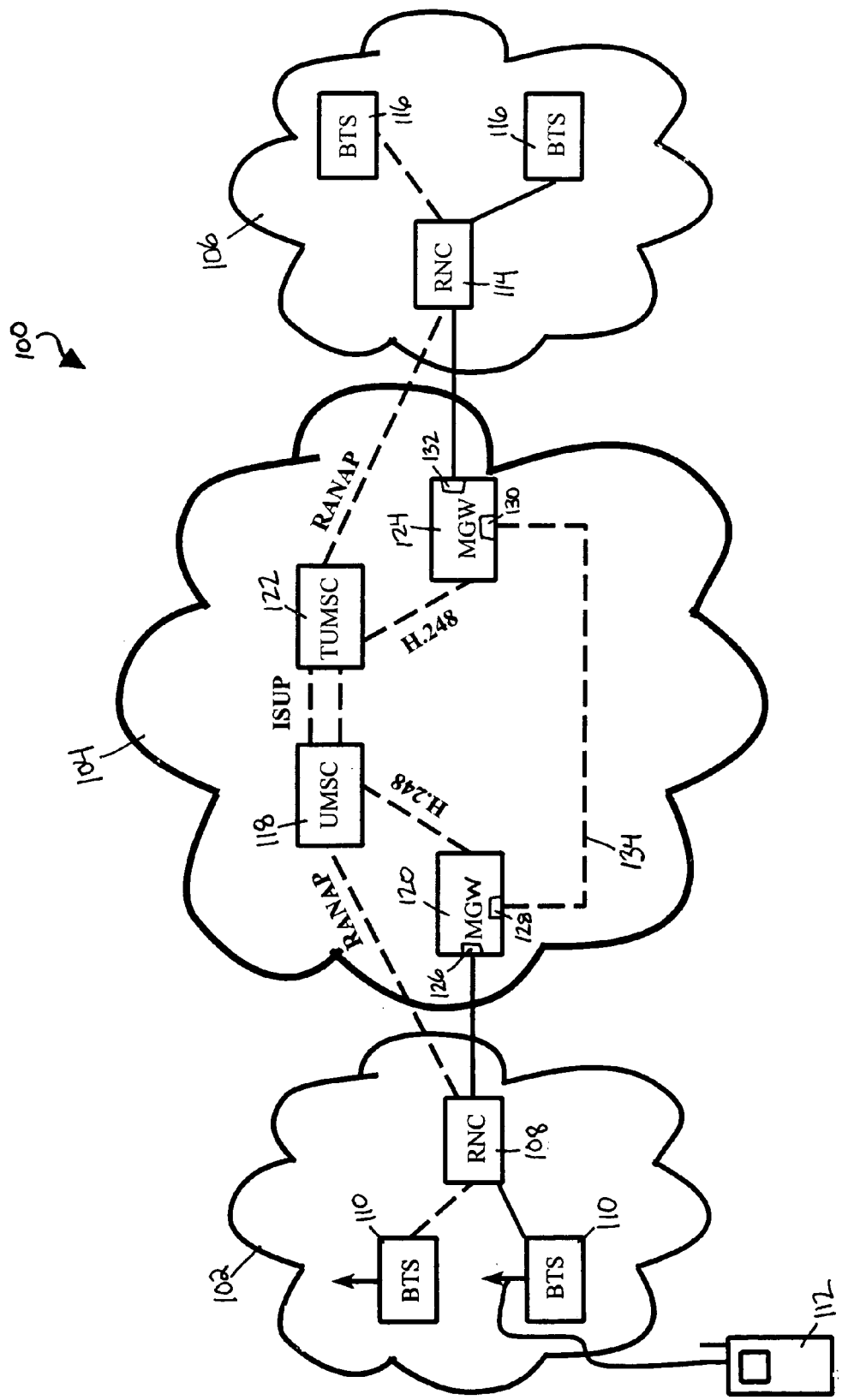
FIG. 1 is an illustrative diagram of one embodiment of a communications network configured according to the present invention.

For purposes of illustration and explanation, a universal mobile telephony system (UMTS) mobile to mobile call scenario will be used to describe specific aspects of the present invention. Referring now to FIG. 1, one embodiment of a communications network 100 according to the present invention is illustrated. Network 100 comprises a first access network 102 (e.g., an ATM-based radio access network), an IP-based core network 104, and a second access network 106, of similar or different configuration and topology as network 102.

Network 102 may comprise a radio network controller (RNC) 108 communicatively coupled to one or more base telephony stations (BTS) 110. Each BTS 110 may have or more mobile subscriber units (i.e. a cell phone) 112 communicatively associated therewith. For purposes of illustration and explanation, network 102 and unit 112 will hereafter be assumed as call origination.

Network 106 may comprise a radio network controller (RNC) 114 communicatively coupled to one or more BTS 116. Each BTS 116 may have or more mobile subscriber units (not shown) communicatively associated therewith. For purposes of illustration and explanation, network 106 will hereafter be assumed as call destination or termination.

Network 104 may comprise a universal MSC (UMSC) 118 and a media gateway (MGW) 120, communicatively coupled to one another (e.g, via H.248), and associated and communicatively coupled with network 102. UMSC 118 is a call control server which is performing both ISUP signaling, as well as signaling toward network 102 using, for example, a Radio Access Network Application (RANAP) protocol. Network 104 may also comprise a terminating UMSC (TUMSC) 122 and a MGW 124, communicatively coupled to one another (e.g., via H.248), and associated and communicatively coupled with terminating network 106. UMSC 118 and TUMSC 122 are also communicatively coupled together (e.g., via ISUP).

In order to establish direct communication between MGWs 120 and 124 (establishing the communications link, over IP, between unit 112 and a receiver in network 106), a bearer must be established between the two. Network 100 must decide whether there is, or will be, a two-way communication path between the MGWs. UMSC 118 first establishes a communications link between networks 102 and 104 by initiating a termination point (TP) 126 (TP1) in MGW 120 associated with RNC 108. Next, two-way communication between MGWs 120 and 124 is established. UMSC 118 next issues, for example, an ADD command to MGW 120 in order to establish a second TP 128 (TP2). MGW 120 responds with an ACCEPT message communicating address information, and any applicable UDP information, associated with TP 128.

UMSC 118 communicates this address information to TUMSC 122 (via ISUP). TUMSC 122 issues an ADD command to MGW 124, establishing a third TP 130 (TP3) and communication the address information associated with TP 128. Additionally, TUMSC 122 establishes a communications link between networks 104 and 106 by initiating a fourth termination point (TP) 132 (TP4) in MGW 124 associated with RNC 114, before issuing the ADD command for TP 130. MGW 124, now having the address and UDP information associated with TP 128, may send communication directly to TP 128 containing the address and UDP information associated with TP 130; establishing direct, call-specific, communication link 134 between MGWs 120 and 132. Once this 'bearer' link is established, IP based communication between the MGWs requires no intervention from the other elements of system 100.

Figure 2:
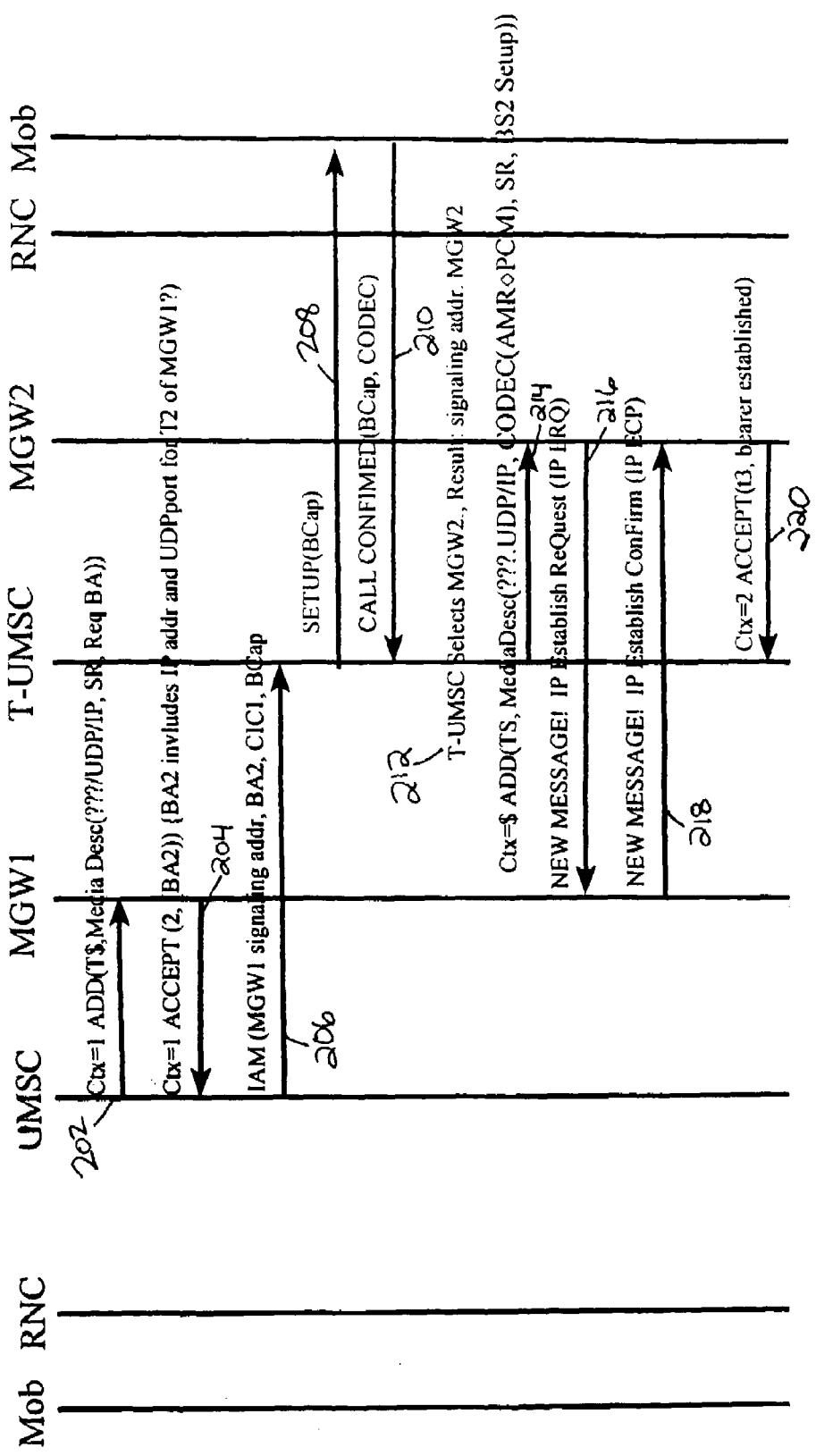
FIG. 2 is an illustrative sequence diagram depicting certain communications of the network of FIG. 1.

FIG. 2 provides a diagram 200 further illustrating the message flow of a portion of the UMTS mobile to mobile call scenario depicted in FIG. 1. The IP address and UDP port number for the TP 128 in MGW 120 is requested by UMSC 118 in a Gateway Control Protocol (GCP) ADD command 202, and sent from MGW 120 to UMSC 118 in a response (ACCEPT message) 204. The received address information is sent in the forward direction to TUMSC 122 in an Initial Address Message (IAM) 206. TUMSC 122 sends a SETUP message 208 towards a receiving mobile in network 106; which sends back a CONFIRM message 210 containing information necessary for proper selection of MGW 124. TUMSC 122 processes this information and selects 212 MGW 124. TUMSC 122 sends the received information to MGW 124 in another ADD command 214, with the instruction to MGW 122 to send its address information over IP to MGW 120 (i.e. TP 128). This instruction may be accomplished using a SETUP parameter in the ADD command (e.g., as is done in the ATM case to request the setup of an AAL2 connection to from MGW 124 to MGW 120). After MGW 124 sends 216 the address information associated with TP 130, and MGW 120 confirms 218 receipt back to MGW 124, MGW 124 sends and ACCEPT message 220 back to TUMSC 122 finalizing the establishment of TP 130. A direct, IP-based, bearer link 134 is established between MGWs 120 and 124 for the call in question.

The address information exchange from MGW 124 to MGW 120 can be done using UDP as a transport protocol. In that case two messages may be utilized. The first message 216 will send the address information from MGW 124 to MGW 120. This message may be called IP Establish Request (IPER) or some other suitable name. This message will at least include the IP address and UDP port number for both MGW 120 and MGW 124. The second message 218 will respond from MGW 120 confirming reception of the IPER message 216. This message may be called IP Establish Confirm (IPEC) or some other suitable name. If TCP is used as the transport protocol, only IPER message 216 is utilized, since TCP has a confirmation mechanism.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. For example, although the present invention has been described herein within the context of a UMTS wireless telecommunications network, the present invention may be implemented in any of a number of different telecommunications systems. The description as set forth is not intended to be exhaustive or to limit the invention to the precise form disclosed. Many modifications and variations are possible in light of the above teaching without departing from the spirit and scope of the following claims.

What is claimed is:

1. A method for establishing a packet communications link within a packet based communication network having a first call control server communicating with a first media gateway and a second call control server communicating with a second media gateway wherein said first media gateway provides a communication link to a calling party terminal and said second media gateway provides communication link to a called party terminal, in response to a circuit switched call setup message, comprising the steps of:
   providing a controlling signal from said first call control server to said first media gateway for establishing a first termination point for connecting said first media gateway with said calling party terminal wherein said first media gateway further connecting said calling party terminal communicating circuit switched data to said packet based communications network;
   generating a circuit switched call setup message from said first call control server to said second call control server associated with said called party terminal, said call setup message further including identification data associated with said first media gateway;
   providing a controlling signal from said second call control server to said second media gateway for establishing a second termination point for connecting said second media gateway with said called party terminal wherein said second media gateway further connecting said called party terminal communicating circuit switched data to said packet based communications network wherein said controlling signal from said second call control server further includes the identification data associated with said first media gateway; and
   establishing a third termination point on said first media gateway and a fourth termination point on said second media gateway for establishing a direct call specific packet communication link from said second media gateway to said first media gateway using said identification data associated with said first media gateway for communicating data between said party terminal and said called party terminal.

2. The method of claim 1 wherein the establishment of the first termination point further comprises the establishment of the third termination point within said first media gateway for communicating packet data with said second media gateway.

3. The method of claim 2 wherein the establishment of the third termination point further comprises issuance of a response containing the information associated with the address of the third termination point from the first media gateway to the first call control server.

4. The method of claim 3 wherein said third terminal point comprises a UDP port number associated with said first media gateway.

5. The method of claim 3 wherein said third terminal point is further communicated from the first call control server to said second call control server within said generated call setup message.

6. The method of claim 1 wherein the generation of a call setup message from said first call control server to said second call control server comprises transmitting a call setup message over a circuit switch network connection.

7. The method of claim 6 wherein said call setup message comprises an ISDN User Part (ISUP) signal.

8. The method of claim 1 wherein said controlling signal from said first call control server to said first media gateway uses H.248 protocol over a packet communication link.

9. The method of claim 1 wherein the establishment of the second termination point further comprises the establishment of a fourth termination point within said second media gateway for communicating packet data with said first media gateway.

10. The method of claim 9 wherein said establishment of said communication link further comprises sending address and UDP information associated with said third termination point on said first media gateway to said second media gateway via said first call control server and said second call control server for establishing the call specific communication link from said second media gateway to said first media gateway using said fourth termination point and said third termination point as two terminating addresses.

11. The method of claim 1 wherein the issuance of said controlling signal form said first call control server to said first media gateway comprises the issuance of an ADD message.

12. A packet based communication network including a first media gateway for communicating with a first party terminal, a first call control server for controlling said first media gateway and a second media gateway for communicating with a second party terminal, and a second media gateway for controlling said second media gateway, said packet based communication network comprises:
   means within said first call control server for instructing said media gateway to establish a first termination point for communicating with said first party terminal wherein said first media gateway receiving circuit switched data from said first party terminal and for establishing a second termination point for communicating packet data, including circuit switched data received from said first party terminal, with said second media gateway over said packet based communication network in response to receiving a call setup request from said first party terminal towards said second party terminal;
   means within said first call control server for generating a circuit switched based call setup message towards said second call control server wherein said call setup message includes identification data associated with said second termination point; and
   means within said second call control server for providing a controlling signal to said second media gateway for establishing a third termination point for communication with said second party terminal and a fourth termination point for establishing a direct call specific packet communication link from said second media gateway to said first media gateway using said identification data associated with said first media gateway.

13. The first call control server of claim 12 wherein said means for generating said call setup message generates an ISDN User Part (ISUP) signal over a circuit switch network connecting said first call control server with said second call control server.

14. The ISUP signal of claim 13 further comprising UDP information associated with said second termination point within said first media gateway.

15. The packet based communication network of claim 12 wherein said means within said first call control server uses H.248 protocol over a packet based link for instructing said first media gateway.

16. A method for establishing a communications link between a first party terminal and a second party terminal within a packet based communication network having a first call control server communicating with a first media gateway and a second call control server communicating with a second media gateway wherein said media gateway provides a communication link to said first party terminal and said second media gateway provides communication link to said second party terminal, in response to a call setup message, said method comprises the steps of:

receiving a circuit switched based call setup message at a first call control server for establishing a communication link from said first party terminal to said second party terminal;

instructing said first media gateway from said first call control server to establish a first termination point for communicating with said first party terminal and a second terminal point for communicating with said second party terminal wherein said first media gateway further communicating packet data including circuit switched data received from said first party terminal over said packet based communication network; and transmitting by said first call control server a circuit switched call setup message towards said second call control server serving said second party terminal wherein said call setup message includes data identifying said second party terminal and said second termination point enabling said second call control server to instruct said second media gateway to establish a direct call specific packet communication link between a third termination point within said first media gateway using said identification data.

17. The method of claim 16 wherein said call setup message transmitted by said first call control server comprises an ISDN User Part (ISUP) signal.

18. The method of claim 16 wherein said second termination point includes a UDP information with said second termination point within said first media gateway.

19. The method of claim 16 wherein said second media gateway establishes a call specific packet communication link towards said first media gateway using said second termination point as the destination address.

20. The method of claim 16 wherein said step of instructing uses H.248 protocol over a packet based communication link between said first call control server and said first media gateway.

* * * * *